United States Patent [19]

McCabe et al.

[11] Patent Number: 4,762,093

[45] Date of Patent: Aug. 9, 1988

[54] COMPACT CATALYTIC DISSOCIATOR SYSTEM FOR COLD STARTING METHANOL-FUELED CARS

[75] Inventors: Robert W. McCabe, Lathrup Village; David F. McCready, Clinton Township, Macomb County; Philip V. Mohan, Birmingham; Robert A. Potter, Warren, all of Mich.

[73] Assignee: General Motors Corporation, Detroit, Mich.

[21] Appl. No.: 37,011

[22] Filed: Apr. 10, 1987

[51] Int. Cl.[4] ............................................. F02B 43/08
[52] U.S. Cl. ................................. 123/3; 123/179 G; 123/180 AC
[58] Field of Search ....... 123/3, 1 A, 179 G, 180 AC, 123/526, 576

[56] References Cited

U.S. PATENT DOCUMENTS

| | | | |
|---|---|---|---|
| 4,350,133 | 9/1982 | Greiner | 123/550 |
| 4,418,653 | 12/1983 | Yoon | 123/3 |
| 4,441,416 | 4/1984 | Yoon et al. | 123/3 |
| 4,444,158 | 4/1984 | Yoon | 123/3 |
| 4,476,818 | 10/1984 | Yoon | 123/3 |
| 4,488,517 | 12/1984 | Yoon | 123/3 |
| 4,499,864 | 2/1985 | Lovercheck et al. | 123/3 |
| 4,520,764 | 6/1985 | Ozawa et al. | 123/3 |

OTHER PUBLICATIONS

Pefley et al, "Methanol Fueled Vehicles for the Federal Government", presented at The Tenth Energy Sources Technology Conference, Dallas, Tex., Feb. 1987.
Berger, "Ultrasonic Nozzles Take Pressure Out of Atomizing Processes", *Research & Development*, Sep. 1984.
Brochure printed by Sono-Tek Corporation entitled, "Sono-Tek Ultrasonic Nozzles".

*Primary Examiner*—E. Rollins Cross
*Attorney, Agent, or Firm*—George A. Grove

[57] ABSTRACT

A practice is disclosed for the start-up of a methanol-fueled engine at low ambient temperatures. Liquid methanol fuel is atomized using ultrasonic energy, mixed with air and introduced over a methanol oxidation-dissociation catalyst. Methanol oxidation is used to heat the catalyst to an elevated temperature at which methanol dissociation provides a noncondensable fuel comprising carbon monoxide and hydrogen for the start-up of the engine at low ambient temperature.

3 Claims, 1 Drawing Sheet

COMPACT CATALYTIC DISSOCIATOR SYSTEM FOR COLD STARTING METHANOL-FUELED CARS

This invention relates to the cold weather starting of methanol-fueled spark-ignited automotive engines. More specifically, it relates to a system employing an ultrasonic methanol spray injector in combination with a suitable catalytic reactor for producing a noncondensable fuel from methanol for the purpose of cold starting such an engine.

BACKGROUND OF THE INVENTION

Many experts foresee increasing usage of methanol (methyl alcohol) as a fuel in spark-ignited automotive engines. Methanol can be produced from such materials as natural gas, coal or other abundant natural products. Therefore, it offers considerable promise as a replacement for gasoline to power automotive vehicles. A difficulty with the use of methanol in such application is its low volatility. At ambient temperatures of 10° C. and lower, it is difficult to provide methanol vapors in sufficient quantities to start the engine. The vapor pressure of the methanol is too low and the methanol vapor condenses on cold engine surfaces.

One approach to the cold starting of methanol-fueled engines is to employ a second, more volatile fuel such as gasoline or propane. The engine can readily be started through the use of such a second fuel, but the storage and controlled delivery of the second fuel adds complexity to the system.

It has been recognized that methanol can be dissociated into carbon monoxide and hydrogen, two noncondensable gases that can be readily used as produced on board the vehicle to start the engine. The engine would be operated using carbon monoxide and hydrogen as at least part of the fuel charge until it is warm enough to be operated solely on liquid methanol. There are no catalysts which will dissociate methanol at temperatures near room temperature or below at the rates required to start an engine. Thus, if a catalyst is to be employed to dissociate methanol, supplemental heat must be used in a cold starting system to raise the catalyst temperature to approximately 250° C. to 300° C. where rapid methanol dissociation occurs. Moreover, heat must be continually supplied to the catalyst to overcome heat losses associated with both methanol vaporization and the endothermic dissociation reaction.

Yoon, U.S. Pat. No. 4,488,517, discloses a cold start method for methanol-fueled cars. A quantity of liquid methanol is vaporized employing electrical resistance heating. A catalytic dissociation reactor is heated by electrical resistance to a desired temperature. The methanol vapor is mixed with air and the mixture conveyed to the dissociation reactor where partial combustion of the vaporized alcohol occurs as well as dissociation of some of the alcohol to form a mixture that contains hydrogen and carbon monoxide. The hydrogen-carbon monoxide containing mixture is employed in the starting of the engine. A difficulty with the Yoon system is that it requires vaporization and superheating of methanol and storage of the vapor. Such a system is both bulky and complicated in its valving and flow configuration. It is also wasteful of electrical energy.

It is an object of our invention to provide a compact system for cold starting a methanol-fueled engine that utilizes an ultrasonic nozzle to introduce and dispense microdrops of methanol into an air stream to form suitable air-methanol mixtures for both heating a dissociation catalyst by oxidation of the methanol and for dissociating a portion of the methanol to provide carbon monoxide and hydrogen as a fuel constituent to start the engine.

Another object of our invention is to provide a method of generating and employing mixtures of microdroplets of methanol and air of varying composition to provide requisite heat for a dissociation catalyst such that suitable quantities of carbon monoxide and hydrogen are efficiently formed for starting of the vehicle engine.

BRIEF DESCRIPTION OF THE INVENTION

In accordance with a preferred embodiment of our invention, these and other objects are accomplished as follows.

In the normal operation of the engine, liquid methanol is sprayed into the throttle body of the engine where it is assimilated into an air stream. The air-methanol vapor mixture is inducted successively into the cylinders of the engine where it is spark-ignited and burned. At temperatures below about 10° C., the methanol condenses on the surface of the intake manifold. Under such conditions, we employ the following system to temporarily supply noncondensable fuel constituents, hydrogen and carbon monoxide, to the throttle body for induction into the engine for start-up.

We employ a suitable methanol dissociation catalyst. An example of a suitable material comprises finely divided platinum dispersed on a high surface area alumina washcoat which in turn is carried on a metal foil. Preferably, the metal foil is corrugated in a herringbone pattern so that it can be wound or folded into a compact configuration providing many parallel fluid passages defined by catalyst-coated surfaces. The catalyst body is initially heated from ambient temperature to about 100° C. by a glow plug or other suitable means. The purpose of this heating is to remove ice or water which may accumulate on the catalyst when the vehicle is not in operation and to promote the oxidation reaction.

During the preheating of the catalyst, air is drawn through it. After the catalyst reaches a temperature of about 100° C., methanol fuel from the vehicle fuel tank is then pumped through an ultrasonic nozzle in which it is atomized and from which it is dispersed into the air stream. The methanol-air mixture is initially lean of the stoichiometric ratio to promote oxidation of the methanol to carbon dioxide and water in the catalytic reactor. The oxidation reaction is exothermic and quickly raises the temperature of the lightweight catalyst body. As the temperature of the catalyst body approaches 300° C. and higher, the rate of dissociation of methanol into hydrogen and carbon monoxide is greatly increased. The ratio of methanol to air may then be increased to a rich mixture so that suitable quantities of hydrogen and carbon monoxide are obtained. These gases are then inducted into the engine as fuel for start-up.

During the engine start-up period, the temperature of the catalyst body can be maintained above 300° C. by controlling the amount of methanol atomized and introduced into the air stream. The catalyst will support both oxidation of methanol (an exothermic reaction) and dissociation of methanol (an endothermic reaction). By controlling the methanol supplied to the ultrasonic atomizer, the catalyst can be kept sufficiently hot to support the dissociation reaction which supplies the noncondensable fuel gases to the throttle body of the engine. As the engine is turning over and the generated hydrogen and carbon monoxide are mixed with air and drawn into the feed cylinders of the engine, the vehicle may be started.

This practice need only be followed long enough to get the engine started and raise its temperature sufficiently to run on liquid methanol fuel. The use of the ultrasonic atomizer is found to be a highly effective and energy efficient method of uniformly dispersing droplets of methanol into the air upstream of the catalytic reactor. Furthermore, it facilitates control of the methanol feed to the reactor for heating and control of the catalyst temperature to promote methanol dissociation.

As noted above, the methanol dissociation products, carbon monoxide and hydrogen, are noncondensable at temperatures of concern. Thus, they can be transported through the intake passages of a cold engine to its combustion cylinders. Furthermore, these gases form combustible mixtures with air over a wide range of compositions. This means that ignition can be obtained without too close control of the air-fuel mixture.

Other objects and advantages of our invention will be understood from a detailed description thereof which follows. Reference will be made to the figures and drawings in which:

FIG. 1 is a plot of steady state methanol conversion and product yields as a function of platinum wire temperature for a feed containing 13.3 Pa methanol and 6.1 Pa oxygen; and FIG. 2 is a drawing partly in section illustrating an apparatus system suitable for the practice of our cold start practice.

DETAILED DESCRIPTION OF THE INVENTION

The efficient start-up of a cold methanol-fueled engine depends upon efficient heating of a methanol dissociation catalyst to its operating temperature as well as upon the use of an energy efficient method of delivering methanol to the catalyst in a reactive state. While it is known that methanol can be dissociated over a suitable catalyst such as, for example, platinum, at temperatures of the order of 250° C. to 300° C. or higher, it is neither practical nor energy efficient to maintain the catalyst at this temperature by means of resistance heating using the vehicle's battery as an energy source. Furthermore, when methanol is dissociated over the catalyst, it is brought into contact with the catalyst in a highly dispersed form. Again, it is not an energy efficient or practical practice to vaporize methanol with energy provided by the vehicle battery particularly when the engine is not operating. Our invention provides effective and practical alternatives to the practices described in the Yoon patent and further provides an efficient means for the cold starting of a methanol-fueled engine without the use of a second fuel.

Figure 1:
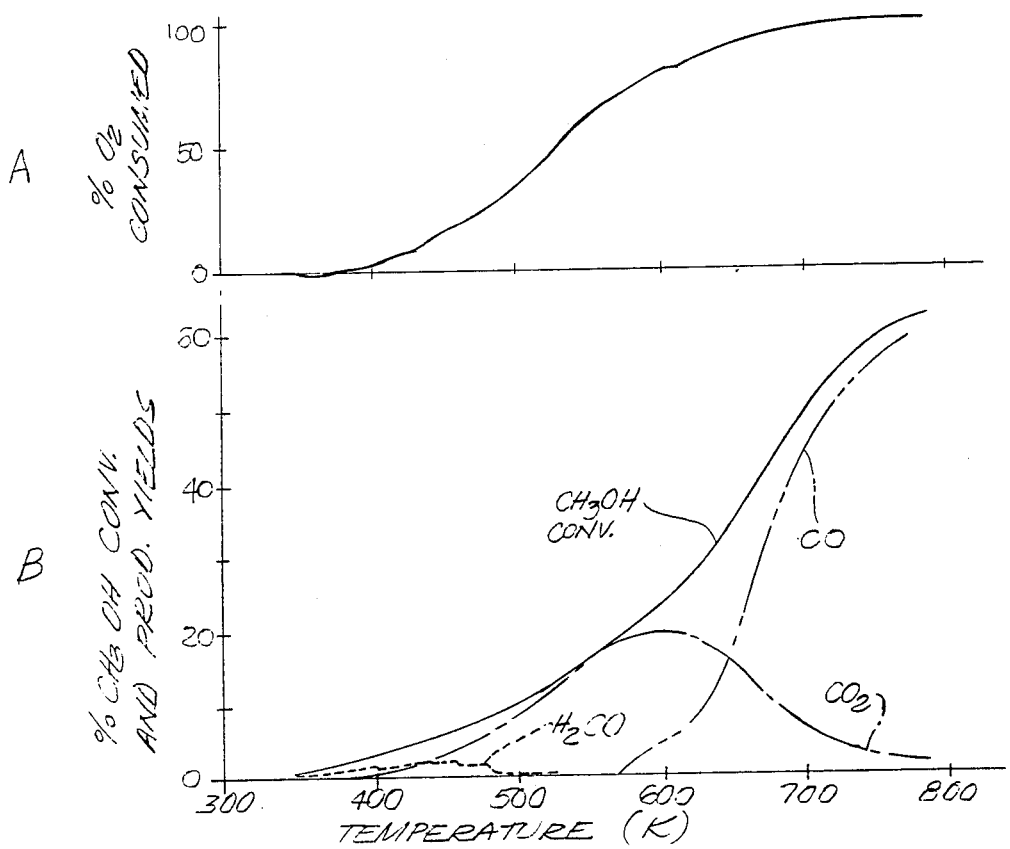

We have observed that a mixture of methanol and air in which the methanol content exceeds the stoichiometric amount for complete combustion can undergo both oxidation and dissociation at a suitable catalyst temperature. FIG. 1 summarizes data from an experiment that illustrates that principle. In the experiment, a platinum wire was first heated to about 70° C. (approximately 340° K.). A mixture of methanol vapor and oxygen, in a volume ratio of 2.2 to 1, was passed over the platinum wire. The proportion of methanol and oxygen was such that the mixture contained about 3.3 times the stoichiometric amount of methanol with respect to oxygen for complete conversion of the methanol to carbon dioxide and water. In other words, the mixture was methanol rich.

FIG. 1 is a composite graph of data produced in this experiment. The (a) portion of FIG. 1 summarizes the percentage conversion of methanol and the yields of reaction products such as carbon monoxide, carbon dioxide and formaldehyde formed as the temperature of the catalyst was increased. The (b) portion of FIG. 1 summarizes the percentage of oxygen in the feed stream that was consumed as the temperature of the catalyst was increased. As the mixture flowed over the catalyst, initially at about 340° K., the predominant reaction was oxidation. Carbon dioxide and small amounts of formaldehyde were detected by mass spectrometry. The oxidation reaction is exothermic and the platinum wire catalyst was heated. It was also heated electrically. As the temperature of the platinum wire increased, more and more of the oxygen was consumed. The conversion of methanol obviously increased. As the temperature of the wire reached about 570° K. (about 300° C.), it was observed that the dissociation of methanol to carbon monoxide and hydrogen is detectable. Evidence of the dissociation is seen in the detection of carbon monoxide in the reactor effluent. As the temperature of the wire is further increased, the dissociation reaction becomes more significant and more carbon monoxide is produced and more of the methanol is converted. At higher temperatures of the wire, much of the methanol-rich feed stream is dissociated into carbon monoxide and hydrogen. In fact, the concentrations of these materials are suitable for starting a spark-ignited engine.

In the experiment summarized in FIG. 1, the proportions of methanol and oxygen were held constant to illustrate that at suitable platinum wire temperatures, oxidation and dissociation can occur simultaneously. In the practice of our start-up method, we contemplate that for the most efficient start-up, the mixture should not be held constant. We propose that initially a suitable catalyst be heated to a temperature of about 130° C. with air flowing over it to be sure that it be free of condensed water or ice. Methanol is then introduced into the air stream and drawn over the catalyst. The initial proportions of methanol and air may be essentially stoichiometric or even on the lean side of the stoichiometric composition so that oxidation proceeds for the purpose of rapidly heating the catalyst. When the temperature of the catalyst is observed to increase to about 450° C. (e.g.), the amount of methanol introduced in the air is then increased so that dissociation occurs and noncondensable fuel gases are formed for starting the engine. By monitoring the temperature of the catalyst, the amount of methanol introduced into the air stream can be controlled to maintain the catalyst at a temperature in excess of 300° C. so that both oxidation and dissociation occur. Since the catalyst body is to be relatively small and lightweight, and since the exothermicity of the oxidation reaction is much greater than the endothermicity of the dissociation reaction, only a minor portion of the on-board methanol need be consumed to heat the catalyst while a much larger portion is dissociated to provide noncondensable fuel constituents.

A more complete description of our start-up practice may be illustrated by reference to FIG. 2. Our practice has been used to start an automobile at a temperature of −30° C. The vehicle contained a four cylinder engine adapted to operate on methanol fuel. Normally, all of the liquid methanol fuel was introduced using a throttle body fuel injector. Our unit depicted in FIG. 2 was mounted under the hood of the vehicle on top of its air cleaner with the effluent from our unit introduced into the air cleaner over the throttle plate.

Figure 2:
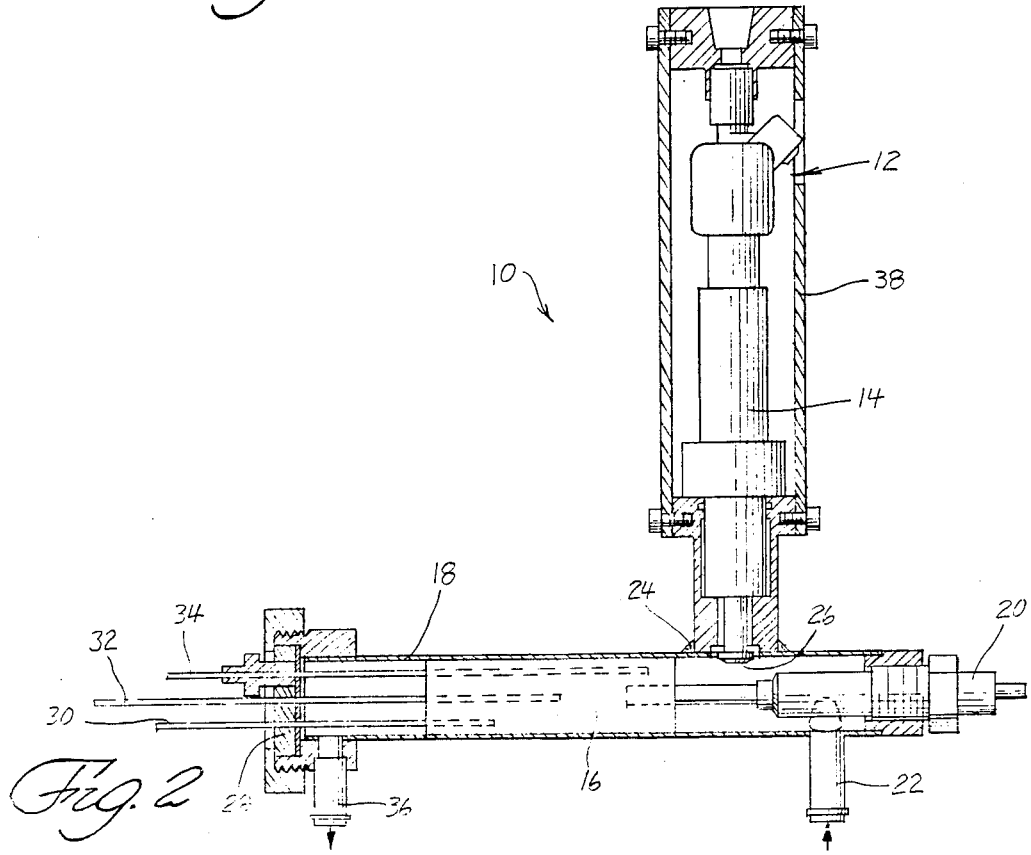

Referring to FIG. 2, an embodiment of the apparatus for the practice of our start-up procedure is illustrated generally at 10. The apparatus comprises a conventional electromagnetically actuated fuel injector 12 which we employed to meter methanol into an ultrasonic atomization nozzle 14. Our apparatus also included a catalyst element or body 16. In this instance, the catalyst body was formed of a corrugated thin metal sheet to which had been applied a gamma alumina washcoat containing a dispersed platinum-palladium-rhodium catalyst. The metal sheet was corrugated in a herringbone pattern and wound such that the corrugations provided longitudinal fluid passages coated with the catalyst. The wound body was inserted in tube 18. Tube 18 was closed at one end with a conventional glow plug 20 such as is employed in the cold start-up of diesel engines. The tube was fitted with an air inlet 22 adjacent to the glow plug 20. The tube was also adapted at 24 to sealingly receive the nozzle end 26 of the ultrasonic atomizer 14 downstream of the air inlet 22 but upstream of the catalyst body 16. The other end of the tube was closed with a fitting 28 containing thermocouples 30, 32 and 34 extending into three regions of the catalyst body 16 along its length. The tube 18 was provided with an outlet fitting 36 which was connected to the throttle body (not shown) of the vehicle. The ultrasonic atomizer 14 and fuel injector 12 were supported and contained in tube 38.

The engine including the apparatus of FIG. 2 was maintained in a cold room at $-30°$ C. When it was desired to start the engine, the glow plug 20 was electrically activated by means not shown to heat the catalyst body to a temperature of about 130° C. to remove any condensed water or ice. At the same time, air from a low pressure source (not shown) was introduced at low velocity through the inlet 22 and past the heated catalyst body 16. Methanol spray from the ultrasonic injector 14 in the form of a cloud of microdroplets was introduced into the air stream. The air-methanol mixture passed over the catalyst body 16 and oxidation occurred as indicated by an increase in the temperature of the catalyst 16. After a period of about 30 seconds, the catalyst body 16 reached a temperature of 450° C., whereupon methanol at a greater rate was introduced into the air stream. The increase in the methanol content was controlled by injector 12 so that the temperature of the catalyst remained above 300° C. The methanol content was about six times the stoichiometric amount for the mass of air passed over the catalyst. The effluent from the catalyst 16 passed through outlet 36 and into the air cleaner (not shown) where it was generally temporarily confined over the throttle plate. After 10 to 20 seconds of operation in this mode, the engine was turned over and started using the gaseous product of our catalyst-containing apparatus along with liquid methanol and outside air drawn in through the idle air port (not shown). The gaseous mixture was drawn by the engine into the throttle body. There it was mixed with ambient air and drawn through the intake manifold into the cylinders of the engine. The normal liquid methanol fuel delivery system was not shut off, and so cold liquid methanol was also injected into the throttle body. When the engine warmed up to the point that its fuel induction system could prevent condensation by liquid methanol fuel injected directly into the throttle body, our system was shut down and the engine operated thereafter in its normal mode.

An important feature of our invention is the use of an ultrasonic nozzle to atomize liquid methanol so as to provide a low pressure, low velocity flow of methanol droplets into the air stream. A suitable device for this purpose is a nozzle presently supplied by Sono-Tek Corporation of Poughkeepsie, N.Y. The nozzle depicted in outline at 14 in FIG. 2 employs electrically actuated piezoelectric disks to activate an atomizing horn and nozzle tip 26. Methanol is introduced into the liquid inlet by any suitable pumping means. We employed an electromagnetically activated fuel injector 12 for this purpose because it could be computer controlled. However, it is to be understood that any suitable pump may be employed. As the liquid flows through the nozzle 14, it reaches the vibrating nozzle tip portion 26. The nozzle tip 26 has a metallic surface that vibrates at frequencies in the ultrasonic ranges suitably above 20 kHz. Very small droplets of methanol emanate from the vibrating surface in a cloud-like dispersion at low velocity and low pressure. Such a fine dispersion even when cold effectively distributes itself uniformly in the air stream in our system and has been found to be suitable for contact with the catalyst element to undergo oxidation and dissociation.

We have employed a highly effective methanol oxidation and dissociation catalyst, namely a finely divided mixture of platinum, palladium and rhodium dispersed on a gamma alumina washcoat and supported on a lightweight metallic sheet carrier. We use the lightweight, highly effective catalyst because it can be heated to methanol dissociation temperatures with a minimum consumption of methanol and in a short period of time. Other lightweight catalyst elements like ceramic monoliths have been interchangeably used for the oxidation and dissociation of methanol may be employed.

We have observed that the efficient start-up of methanol-fueled engines at low ambient temperatures is best achieved by the careful control of the methanol introduction over the catalyst to first permit the catalyst to be rapidly heated by oxidation so that it will soon produce copious quantities of hydrogen and carbon monoxide by the dissociation of methanol. By heating the catalyst by methanol oxidation, the energy of the vehicle battery is not consumed to heat the catalyst element at a time when the battery is needed just to turn over the engine for cold starting. In combination with the practical heating of the catalyst element, we have found that the ultrasonic atomization of liquid methanol is also a valuable and energy efficient practice for introducing methanol into the catalyst element. Again, the piezoelectrically activated ultrasonic atomizer consumes relatively little of the cold battery energy.

The apparatus used in the practice of our method may be quite compact so that it takes up little space under the hood of an automobile. In the embodiment depicted in FIG. 2, each tube or leg of the device was only about seven inches long.

While this invention has been described in terms of a preferred embodiment, it will be appreciated that other forms could be readily adapted by one skilled in the art. Accordingly, the scope of our invention is to be limited only by the following claims.

The embodiments of the invention in which an exclusive property or privilege is claimed are defined as follows:

1. A method for starting a spark-ignited methanol-fueled engine at low ambient temperatures comprising forming atomized droplets of methanol and introducing them into a stream of ambient air to form an air-methanol mixture, passing the stream into contact with a catalyst that promotes both the oxidation and dissociation of methanol, the proportion of methanol to air initially being adjusted to promote oxidation to heat the catalyst to a temperature promoting dissociation and the proportion then being increased to provide methanol for dissociation productive of hydrogen and carbon monoxide, and introducing said hydrogen and carbon monoxide into the engine as a fuel for engine start-up.

2. A method for starting a spark-ignited methanol-fueled engine at low ambient temperatures comprising subjecting liquid methanol to ultrasonic vibrations so as to form microdroplets of methanol, introducing said droplets into a stream of air and passing the stream into contact with a catalyst that can promote both oxidation and dissociation of methanol, controlling the methanol content of said mixture so that oxidation occurs on the catalyst to heat it to an elevated temperature at which methanol dissociation is promoted, thereafter increasing the methanol content of said mixture to promote the formation of carbon monoxide and hydrogen as methanol dissociation products, and introducing said products into the engine as a fuel for start-up.

3. A method for starting a spark-ignited methanol-fueled engine at low ambient temperatures comprising forming atomized droplets of methanol and introducing them into a stream of air to form an air-methanol mixture, initially controlling the rate of introduction of methanol into said stream such that the methanol content is lean with respect to a stoichiometric methanol-air mixture, passing the methanol-lean mixture into contact with a noble metal-containing catalyst composed such that it is capable of promoting both oxidation and dissociation of suitable air-methanol mixtures, the methanol-lean mixture undergoing oxidation over said catalyst and the heat release of such oxidation reaction heating the catalyst to an elevated temperature at which it promotes the rapid dissociation of methanol-rich mixtures with air, thereafter increasing the rate of introduction of methanol into the air stream such that the methanol content is rich with respect to a stoichiometric methanol-air mixture, passing the methanol-rich mixture into contact with the heated catalyst to dissociate a portion of the methanol into hydrogen and carbon monoxide while controlling the introduction of methanol into the air so as to maintain the catalyst at a methanol dissociation promoting temperature, accumulating the hydrogen and carbon monoxide-containing effluent stream passing from contact with the catalyst and employing such effluent as fuel for starting the engine.

* * * * *